(12) United States Patent
Akaoui

(10) Patent No.: US 10,403,109 B2
(45) Date of Patent: Sep. 3, 2019

(54) SYSTEM AND A METHOD FOR DETECTING INFORMATION OF ASSETS STORED IN COMMUNICATION TAGS

(71) Applicant: Danny Akaoui, Sarasota, FL (US)

(72) Inventor: Danny Akaoui, Sarasota, FL (US)

(*) Notice: Subject to any disclaimer, the term of this patent is extended or adjusted under 35 U.S.C. 154(b) by 0 days.

(21) Appl. No.: 16/034,284

(22) Filed: Jul. 12, 2018

(65) Prior Publication Data

US 2019/0019386 A1 Jan. 17, 2019

Related U.S. Application Data

(60) Provisional application No. 62/532,315, filed on Jul. 13, 2017.

(51) Int. Cl.
G08B 25/10 (2006.01)
H04Q 9/00 (2006.01)
(Continued)

(52) U.S. Cl.
CPC ..... G08B 13/2462 (2013.01); G06K 7/10297 (2013.01); G06K 19/0723 (2013.01);
(Continued)

(58) Field of Classification Search
CPC .................................................. G08B 13/2462
See application file for complete search history.

(56) References Cited

U.S. PATENT DOCUMENTS

| 2012/0161967 A1* | 6/2012 | Stern | G06Q 10/087 340/572.1 |
| 2014/0035724 A1* | 2/2014 | Rothschild | G01S 13/75 340/8.1 |
| 2014/0266615 A1* | 9/2014 | Ouyang | G01S 5/0252 340/10.1 |

* cited by examiner

Primary Examiner — Joseph H Feild
Assistant Examiner — Pameshanand Mahase

(57) ABSTRACT

Disclosed is a system for detecting information of assets stored in communication tags and communicating assets information over a communication network. The system includes a bi-directional communication reader and a server. The bi-directional communication reader has at least one antenna with associated signal strength and antenna number. The bi-directional communication reader processes the received assets information from the communication tags. The server includes a database for storing asset information and further the server communicates with the bi-directional communication reader. The server stores asset information using a software application. The software application includes a front end application module for configuration, an event module, a back end application module and a communication module. The front end application module configured to receive at least one operational mode from a user. The operational mode relates to setting of operation of the bi-directional communication reader. The event module reads the asset information from the database and alerts the user if a certain event occurs. The event module sets a specific rule that triggers an event. Further the back end application module configures the bi-directional communication reader as per the selected operational mode to process the required information from the communication tags read by the bi-directional communication reader. The communication module receives processed assets information from the communication tags via the bi-directional communication reader from the specific antenna. Further, the communication module communicates the processed assets information over the communication network via a proprietary protocol.

19 Claims, 10 Drawing Sheets

(51) Int. Cl.
  G08B 1/08 (2006.01)
  G08C 17/02 (2006.01)
  G08B 13/24 (2006.01)
  G06Q 10/08 (2012.01)
  G06K 7/10 (2006.01)
  G06K 19/07 (2006.01)
(52) U.S. Cl.
  CPC ....... *G06Q 10/087* (2013.01); *G08B 13/2417* (2013.01); *G08B 13/2468* (2013.01); *G08B 13/2485* (2013.01); *G06K 2007/10504* (2013.01)

Reader Settings

| | |
|---|---|
| Region: ? | North America ⌄ |
| Max Time Loc Tag: ? | 10000 ⌄ |
| Rx Antenna: ? | 2 ⌄ |
| Tx Antenna: ? | 2 ⌄ |
| Ant Group Enable: ? | no ⌄ |
| Max Time Read Tag: ? | 300 ⌄ |
| Discovery Attempts: ? | 3 ⌄ |
| Protocol: ? | proto ⌄ |
| Read Mode: ? | S1 ⌄ |
| Monitor Time: ? | 5 ⌄ |
| Search Flag: ? | 1 ⌄ |
| Tag address: ? | 0 ⌄ |
| Tag Select ID: ? | 1 ⌄ |
| Tag Meta Data: ? | RSSI (2-3) ⌄ |
| Select Data: ? | 0 ⌄ |
| PC Word2: ? | 3000 ⌄ |
| PC Word1: ? | 3000 ⌄ |
| Apply ? | Apply |

FIG. 4

Table readerWareHouse

| tagnumb | tagname | detectstart | alert | access |
|---|---|---|---|---|
| Tag Name | Tag Name | | | |
| e2-00-90-33-11-06-00-66-15-70-6f-b1 | sportsandhealth | NORM | NULL | 2017-02-08 23:10:47 |
| e2-00-90-33-11-06-00-66-16-50-66-f5 | sandhealthcards | NORM | NULL | 2017-02-08 23:10:47 |
| e2-00-90-33-11-06-00-66-10-60-a7-f6 | boacheck | NORM | NULL | 2017-02-08 23:10:47 |
| | | NORM | NULL | 2017-02-08 23:10:47 |

FIG. 8

Filter Search Entries — 902

Entry: ?  tagname
Value: ?  sportsandhealth
Filter Enable: ?  true
Submit: ?  Update Filter Value

- tagnumb
  Enter the tag number with '-' as it appears in the database

- tagname
  Enter the tag name as it appears in the database

- detectstat
  PRES or MISS

FIG. 9

Alerts:

Event Monitor St: ? [on]

Enable Alerts: ? [yes]

| tagname | timeinterval | alertvalue | eventstart | alert |
|---|---|---|---|---|
| sportsandhealth | 20 | MISS | 2017-02-10 11:34:13 | start |
| sandhealthcards | 20 | MISS | 2017-02-10 11:34:13 | start |
| boacheck | 20 | MISS | 2017-02-10 11:34:13 | start |

FIG. 10

SYSTEM AND A METHOD FOR DETECTING INFORMATION OF ASSETS STORED IN COMMUNICATION TAGS

CROSS-REFERENCE TO RELATED PATENT APPLICATIONS

This application claims priority to U.S. Provisional Patent Application Ser. No. 62/532,315, filed Jul. 13, 2017.

BACKGROUND OF THE INVENTION

1. Field of the Invention

Embodiments relate to radio frequency identification (RFID) readers and servers or readers only and the use of RFID tag information in a complete system differentiating from other RFID readers by integrating swiftly into the user's current system with the use of open source databases.

2. Description of the Related Art

RFID is a wireless, non-contact system that uses radio-frequency electromagnetic fields to transfer data from a tag attached to an object for identification and tracking. Other RFID systems combine a RFID reader, RFID tags and a computer software and device from different manufacturers requiring complex integration.

Managing inventories of Radio Frequency Identification (RFID) tagged articles is a common practice in the industry. Numerous commercial applications exist for managing RFID-tagged inventories either in a warehouse type location or in a specific storage cabinet.

Typically, the RFID tags are read by an RFID reader when articles enter or exit the warehouse or cabinet, or the warehouse or cabinet are sampled at certain time points in order to determine the inventory levels or specific conditions of the tagged-articles.

For example, an RFID tag may contain information about the expiration date of the article, so it could be interesting to read all RFID tags in order to determine the expected shelf life of each article. In prior art, the RFID reader is a stand-alone reader that reads the RFID tag on the object and communicates data to other computers and does not hold the data and processes within the RFID reader. The prior art does not communicate through a proprietary protocol.

Further, the current applications failed to provide a back end application that instructs the reader or readers to read from a specific antenna. Therefore, there is a need of a system that allows the RFID reader to support an unlimited number of antennas to be able to read an unlimited number of assets through large areas using multiple antennas and multiple readers. The system should include a front end, a back end, a reader and a monitoring application. The back-end application in the configuration server reads the data from the RFID reader using a proprietary protocol and stores the data into an open source database located in the LAN or in the cloud. Furthermore, the back end application allows each reader to activate one antenna one at a time or a reader or readers to prevent any interference.

SUMMARY OF THE INVENTION

An object of the present invention is to provide a system for detecting information of assets located throughout large or small areas stored in communication tags and communicating assets information over a communication network using multiple, even more than 1,000 antennas, and multiple readers, which could be more than 1,000 readers. The system includes a bi-directional communication reader and a configuration server.

Here, a configuration server controls the passive RFID reader via the back-end application running on the server. The configuration server via the back-end application instructs the RFID reader to receive RFID tag data information from a specific antenna installed on the reader. The back-end application in the configuration server is able to configure and control an unlimited number of RFID antennas/readers while maintaining no interference. The bi-directional communication reader has at least one antenna with associated signal strength and antenna number. The bi-directional communication reader processes the received assets information from the communication tags.

The server includes a database for storing asset information and further the server communicates with the bi-directional communication reader. Further, the database can be located on a different server locally in the LAN or in the cloud. The server stores asset information using a software application. The software application includes a front end application module, an event module, a back end application module and a communication module. Module includes processes or programs that run on the server and perform specific functionality.

The front end application module receives at least one operational mode from a user, wherein the operational mode relates to setting of the operation of the bi-directional communication reader. The event module reads the asset information from the database and alerts the user if a certain event occurs. The event module is configured by the front end application module to set a specific rule that triggers an event.

The back end application module is configured via the front end application module. Further, the back end application module configures the bi-directional communication reader, as per the selected operational mode, to process the required information from the communication tags read by the bi-directional communication reader.

The communication module receives processed assets information from the communication tags via the bi-directional communication reader from the specific antenna. Further, the communication module communicates the processed assets information over the communication network via a proprietary protocol.

Another object of the present invention is to provide a system wherein the software application further includes an event module configured in the front end application module for setting up an alert. Further, the event module is configured in the front end application module to send alert messages of missing assets as per the selected alert setting over the communication network.

Another object of the present invention is to provide a system wherein the mode includes at least one of a monitoring mode, a discovery mode, a detection mode, a check-in mode, and a real time mode. The antenna provides a range of power and communicates with the assets at different frequencies and ranges and power settings. Further, wherein any mode or the real-time mode sets antenna to locate assets depending on the number of antennas.

Another object of the present invention is to provide a database setup to allow a user to set up the database for secure access and a table setting to allow the user to create display entries in the database. Further, the database can be located on the server locally in the LAN or in the cloud.

These and other objects, features and advantages of the invention will become more fully apparent in the following detailed description, taken in conjunction with the accompanying drawings.

BRIEF DESCRIPTION OF DRAWINGS

FIG. 4 illustrates a screenshot showing the front end application module of reader settings of antenna;

FIG. 8 illustrates a screenshot showing the front end application module of table reader entries;

FIG. 9 illustrates a screenshot showing the front end application module of filter search setting in accordance with an exemplary embodiment of the present invention; and FIG. 10 illustrates a screenshot showing the front end application module of the event module status in accordance with an exemplary embodiment of the present invention.

DETAILED DESCRIPTION OF DRAWINGS

Figure 1:
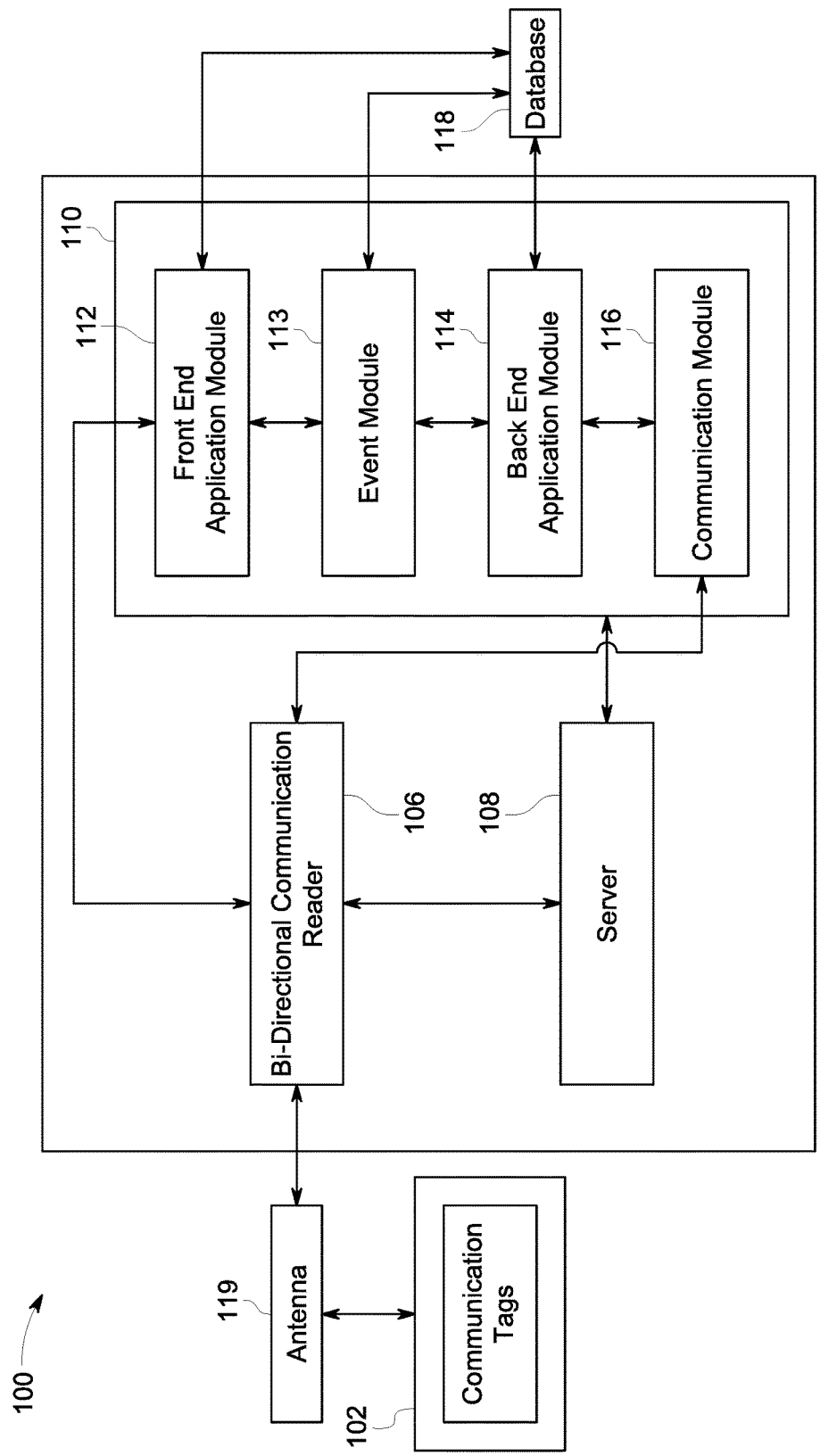
FIG. 1 illustrates a block diagram of a system for detecting information of assets stored in communication tags and communicating the assets information over a communication network.

While this technology is illustrated and described in a preferred embodiment, a system for detecting information of assets stored in communication tags and communicating the assets information over a communication network may be produced and described in many different configurations, forms and various methods, without deviating from the scope of the present invention. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a block diagram of a system 100 for detecting information of assets 102 stored in communication tags 104 and communicating the assets information over a communication network. The system 100 includes a bi-directional communication reader 106 and a server 108.

In a preferred embodiment of the present invention, the communication tag 104 and the bi-directional communication reader 106 are RFID based. However, it would be readily apparent to those skilled in the art that various types of the communication tag 104 and the bi-directional communication reader 106 may be envisioned without deviating from the scope of the present invention. The antenna 119 receives and communicates with the communication tags 104.

The bi-directional communication reader 106 has at least one antenna. The bi-directional communication reader 106 processes the received assets information from the communication tags 104. The server 108 communicates with the bi-directional communication reader 106. The function of antenna 119 is explained in detail in conjunction with FIG. 4 of the present invention.

The bi-directional communication reader 106 communicates with the assets 102 according to the ISO 18000-6C Gen 2 or future protocol. The assets operate according to the ISO 18000-6C Gen 2 protocol and have five operational modes. The operational modes are explained in detail in conjunction with FIG. 3 of the present invention.

The bi-directional communication reader 106 supports up to two monostatic antennas, which cover a RFID tag read distance that is over 30 feet and further distances. The bi-directional communication reader 106 has five different operational modes. Further, the reader 106 features brown out recovery and flash redundancy support with live upgrade capability and requires no user programming.

The server 108 stores and processes a software application 110. The software application 110 includes a front end application module 112, an event module 113, a back end application module 114, and a communication module 116. The front end application module 112 receives at least one operational mode from a user. The server may be located either locally or in the cloud. The operational mode relates to the setting of the operation of bi-directional communication reader 106. The operational modes are explained in detail in conjunction with FIG. 3 of the present invention.

The event module 113 reads the asset information from the database 118 and alerts the user if a certain event occurs. The event module is configured by the front end application module to set a specific rule that triggers an event. The scalability to support an unlimited number of antennas is achieve by repeating the modules 113, 114 and 116 to communicate with each 106. The event module 113 is explained in detail in conjunction with FIG. 10 of the present invention.

Examples of an event include alerting the user when an asset is present or missing or if an asset is about to expire. Additional examples of events include, but are not limited to, finding assets in a warehouse, tracking wandering patients in a hospital, tracking people in event management, inventory management etc. The examples are explained in detail from paragraph 70 of the present invention.

The back end application module 114 is configured via the front end application module 112. Further, the back end application module 114 configures the bi-directional communication reader 106 as per the selected operational mode to process the required information from the communication tags 104.

The communication module 116 receives processed asset information from the communication tags 104 via the bi-directional communication reader 106 from a specific antenna. Further, the communication module 116 communicates the processed asset information over the communication network. Examples of the communication network include, but are not limited to, TCP/IP over internet, LAN, Bluetooth, WiFi and other similar communication modes.

In another preferred embodiment of the present invention, the communication tags are created and customizable. The communication tags may be customized with customer specific information and company specific information to make them accessible for the specific customer in their bi-directional communication reader.

Figure 2:
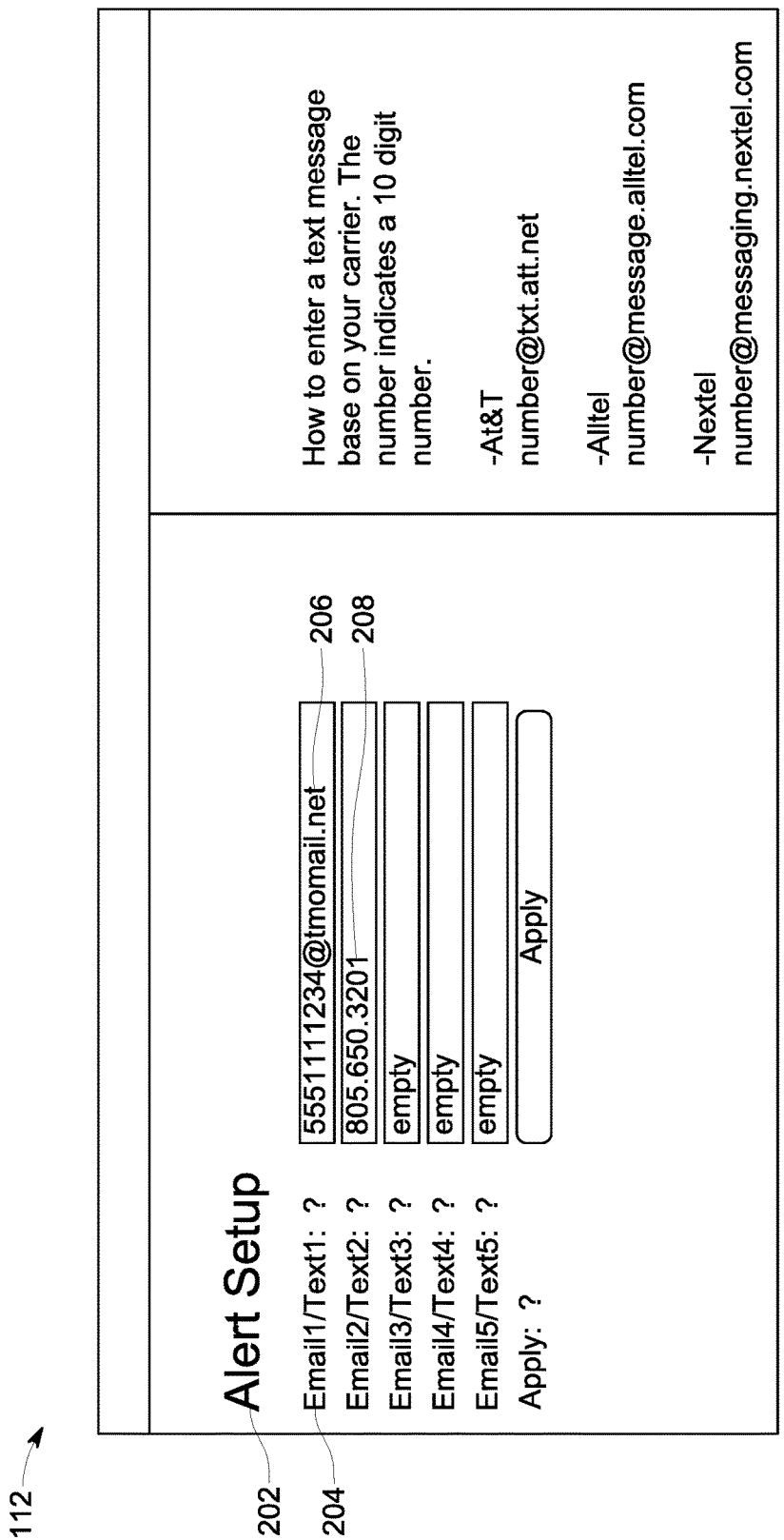
FIG. 2 illustrates a screenshot showing a front end application module for setting up an alert.

FIG. 2 illustrates a screenshot showing the front end application module 112 for setting up an event module 113 using the alert setup 202. The event module 113 is configured in the front end application module 112 to setup the alert.

Further, the event module 113 using the alert setup 202 is configured by the front end application module to send alert messages of missing assets as per the selected alert setting over the communication network based on asset information read from the database 118. The asset information in the database 118 is stored by the back end application module 114. As shown in FIG. 2, the user may enter details via the front end application related to either an email or text 204 to allow the event module to send text or email alerts. The details contain the email ID 206 or the phone number 208.

Generally, the event module 113 using the alert setup 202 reads the assets that are located in the database 118 and compares the time of the last read with the current time. If the asset is missing for a period of time, then a text or email message is sent to the user(s) from the event module depending on the text and/or email message setup.

Another alert is sent again based on the recurring time that is set by the front end application and configuration by the user. The user may set up different types of alerts based on user specified entries. Alerts may be text or email or other communications forms.

The monitoring mode (shown in FIG. 3) is set by the front end application using the mode setting in 302 to allow the back end application to communicate with the bi-directional communication reader.

Figure 3:
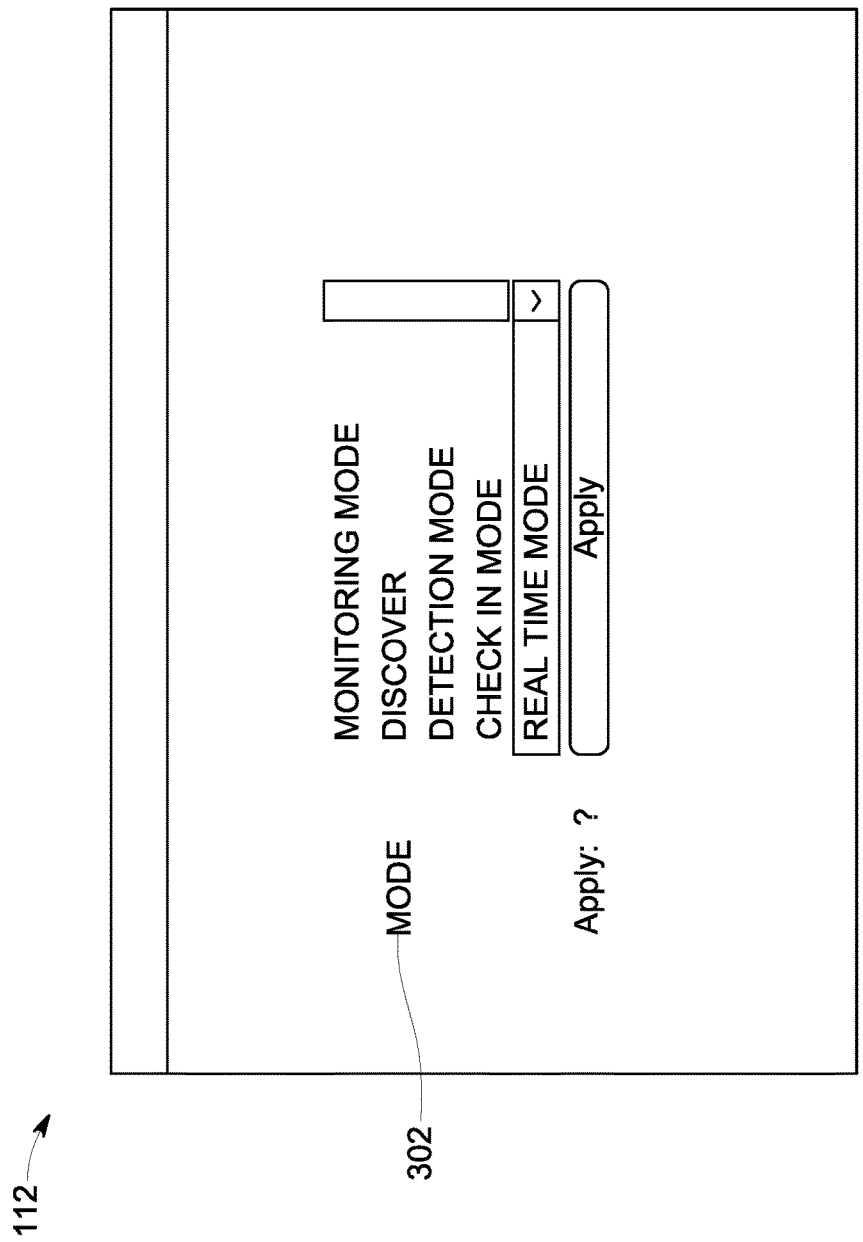
FIG. 3 illustrates a screenshot showing the front end application module for selecting a communication mode.

FIG. 3 illustrates a screenshot showing the front end application module 112 for selecting an operational mode 302 in accordance with a preferred embodiment of the present invention. The front end application module 112 receives at least one operational mode 302 from a user. Examples of the mode 302 include but are not limited to monitoring mode, discovery mode, detection mode, check-in mode and real-time mode.

The monitoring mode allows the user to set up priorities for monitoring discovery of assets through the front end application module. Examples of the priorities for discovery of assets are low priority, medium priority and high priority.

The low priority instructs the back end application module to attempt to detect the asset last. The medium priority instructs the back end application to read the asset as a middle priority. The high priority instructs the back end application to read the asset first or beginning of the cycle.

Further, the monitoring mode, configured in the back end application module, reads the communication tags one at a time based on the assets priority. Furthermore, the monitoring mode compares and confirms the presence of assets in the server. The assets are located in the vicinity of the antenna.

The discovery mode is configured in the back end application module to read the assets information received from the bi-directional communication reader. Further, the discovery mode configured in the front end application module allows the user to read all assets simultaneously and only update the assets with current assets that are located in the database or server. The discovery mode allows the reader to detect the current tags.

In a preferred embodiment of the present invention, if the asset is located in the database, a flag of present is added next to the asset. Further, the return signal strength is updated, the antenna number is updated and the latest time/date of discovery of the asset monitored is updated. The back-end application repeats the process an infinite number of times until the front-end application 112 tells the back-end application to stop detecting. The start and stop setting is explained in detail in conjunction with FIG. 5 of the present invention.

The detection mode, configured in the front end application module, informs the back end application module to read and store new assets in the database if the assets do not currently reside in the database. Generally, in the detection mode, if the assets are located in the database, a flag of present is added next to the asset and the time/date of detection is added into the database. The advantage of the detection mode is it allows the user to add new assets to a current database and not override assets that are already in the database.

If the assets are not located in the database and are discovered, then a new asset is added to the database with the time/date of detection. The back-end application module repeats the process an infinite number of times until the front application module is configured by the user to stop detection mode.

The check-in mode provides status of the assets in the database over the communication network. The check-in mode includes at least one of check-in status to mark the entry of the asset and the check-out status to mark the exit of the asset from the database.

The real time mode is configured in the front end application module and allows the user to detect the presence of the assets in the database at a fast rate. Further, the real time mode configured in the back end application module sets the number of antennas and further detects if any asset is missing based on the time when the asset is last detected.

FIG. 4 illustrates a screenshot showing of the front end application module 112 of reader settings of antenna. The front end application 112 allows the user to provide a range of power and communicates with the assets at different frequencies and ranges. Further, any mode or the real-time mode sets the antenna to locate assets depending on the number of antennas.

In a preferred embodiment, the antennas may either be bistatic or monostatic. A monostatic antenna is able to transmit and receive RF signals to and from the items. As shown in FIG. 4 in an exemplary embodiment of the present invention, the user is allowed to set up the antenna of the reader. The user is able to add information associated with setting up the antenna such as:

Select NA for North America or EU for the European region
RX Antenna: 2
  Select 2 if Antenna is connected to Antenna 2
  Select 1 if Antenna is connected to Antenna 1
TX Antenna: 2
  Select 2 if Antenna is connected to Antenna 2
  Select 1 if Antenna is connected to Antenna 1
Ant Group Enable: no then click Apply
  Select yes if both Antenna are enabled With the communication mode, the bi-directional communication reader communicates at different frequencies and reads the item numbers from a specific antenna and sends the data back to the configuration server in the back-end application module via the communication module 116 using the proprietary RFR protocol.

The RFR protocol is used by the communication module 116 to allow the backend software to control the reader and set the specific control settings to enable the backend protocol to read the tags from the reader based on important settings such as protocol configuration setting, the region, the timeout settings, check whether the reader is alive, the version of the reader as well as the number of tags that are read. Based on the communication mode, the back-end configures the reader using the communication module 116 that uses the handshake mode proprietary RFR protocol. The reader operates in real time as opposed to archived in a configuration file.

Figure 5:
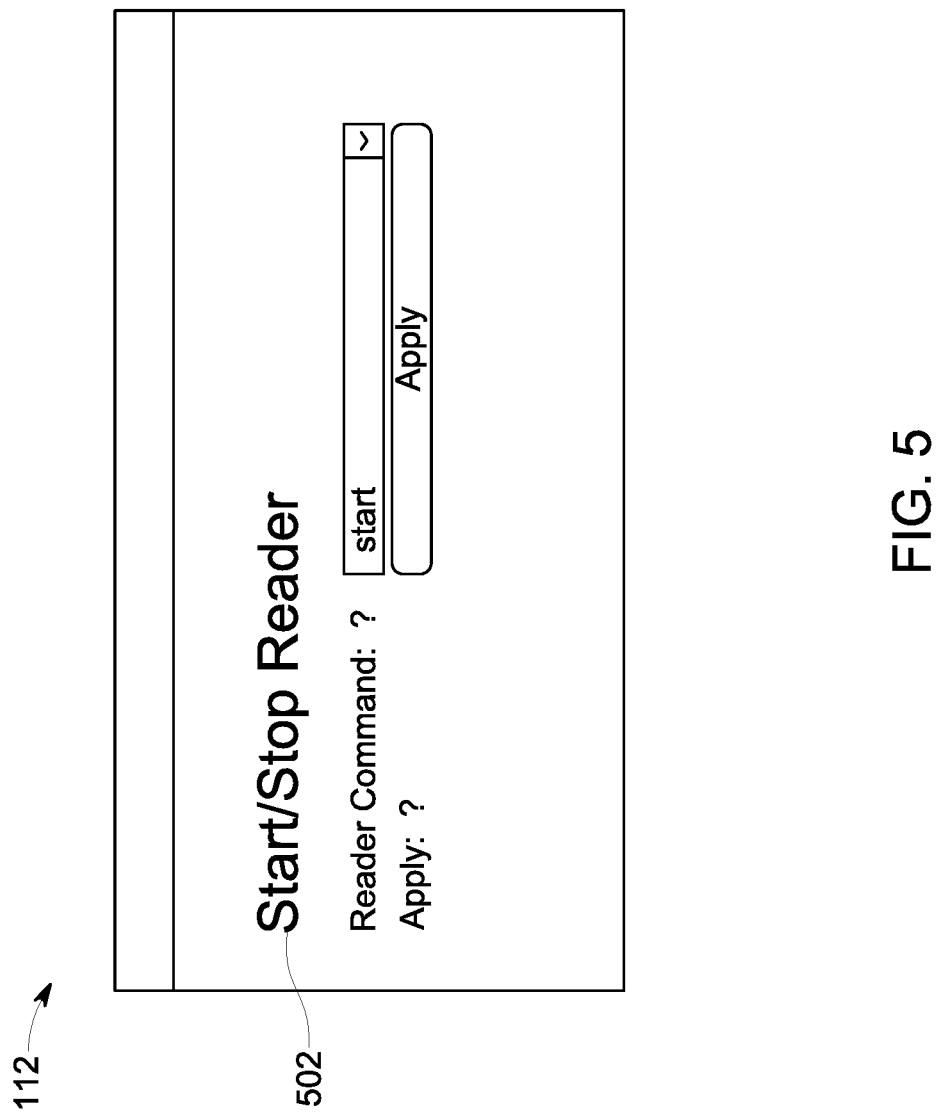
FIG. 5 illustrates a screenshot showing the front end application module of start/stop setting.

FIG. 5 illustrates a screenshot showing the front end application module 112 of start/stop setting 502. The front end application allows the user to select either start or stop setting, to control the operation of the bi-directional communication reader. The start or stop setting results in stopping or starting of the bi-directional communication reader.

Figure 6:
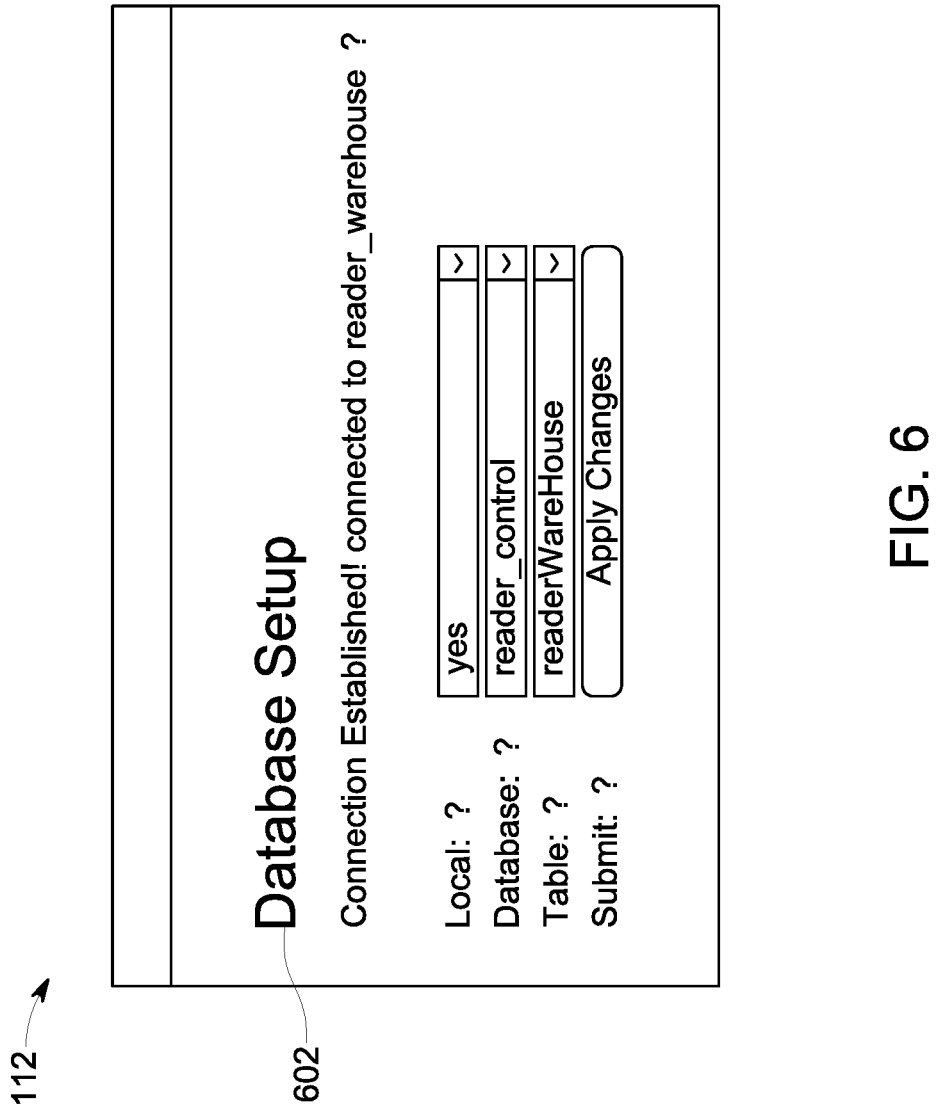
FIG. 6 illustrates a screenshot showing the front end application module for setting up of a database.

FIG. 6 illustrates a screenshot showing the front end application module 112 for setting up of a database 118 set up 602. In another preferred embodiment of the present invention, the software application further includes a database setup 602 to allow user to set up the database 118 for secure access.

The database 118 setup may be setup from the front end application module by providing a secure database username, password, and network information. The database, for example, may be setup by applying the following steps:
Keyword: dbsetup
Local: yes
If you are using an external Database, Select no.
Database: Select reader_control (database name) then Click Apply
Table: Select readerWareHouse then Click Apply
A connection established connected to readerWareHouse is displayed. Congratulations, you are now connected to the database reader_control and table readerWareHouse! or similar language.

Figure 7:
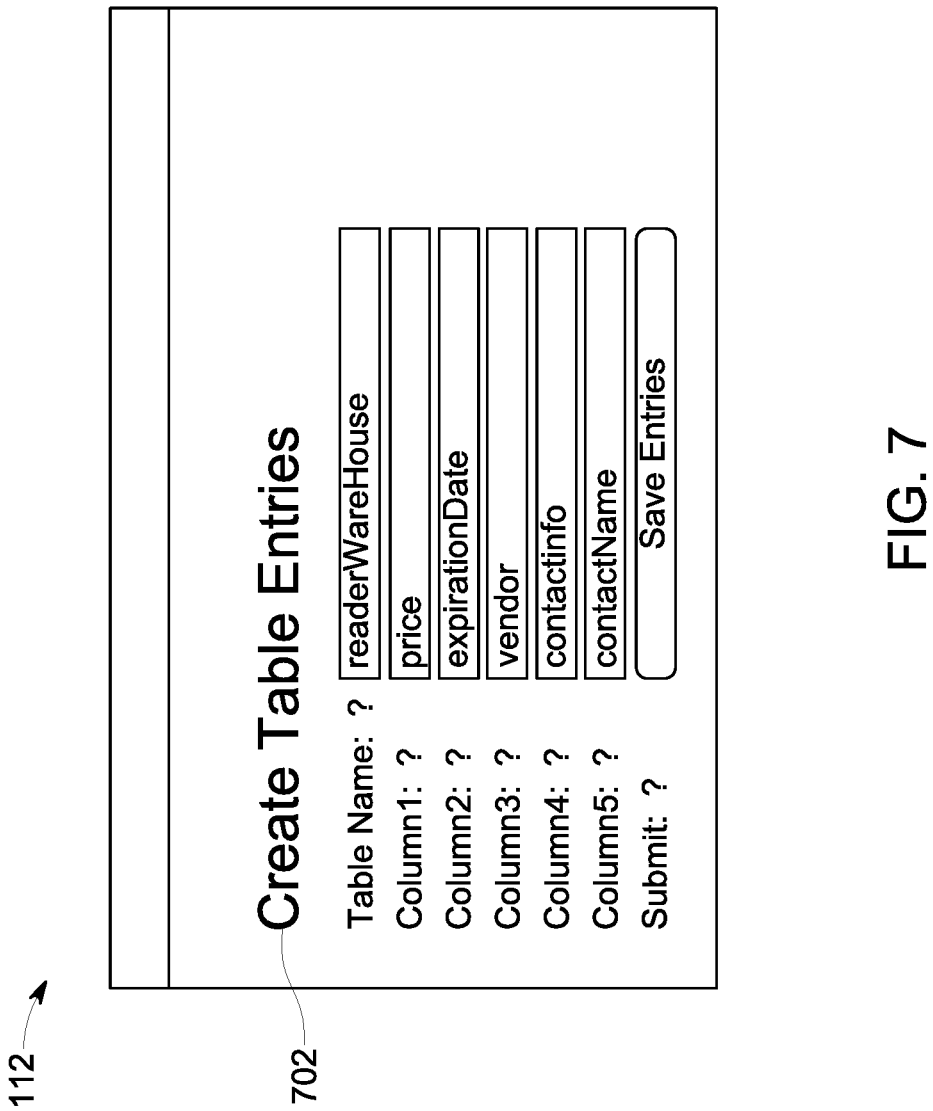
FIG. 7 illustrates a screenshot showing the front end application module of table entries meaning the tables entries may be status or user setting.

FIG. 7 illustrates a screenshot showing the front end application module 112 of a table 702. The front end application further includes a table setting 702 for allowing the user to create a table based on user entries in the database 118.

For exemplary purposes as shown in FIG. 7 of the present invention, the following are the table entries for an inventory/Warehouse:
Table Name: readerWareHouse
Column1: price
Column2: expirationDate
Column 3: vendor
Column4: contatinfo
Column5: contactName
Submit: Save Entries FIG. 8 illustrates a screenshot showing the front end application module 112 of table reader entries 802 from the database 118. The front end application further includes a table reader entries 802 for allowing the user to access the entries indicating the status of communication tags in the vicinity of the antenna 119.

In an exemplary embodiment of the present invention, the following instructions indicate the presence of assets in the table reader 802.
Keyword: access
Table Entries
Table reader_warehouse: Indicates the current table
Tagnumb: Tag number
Tagname: Tag name
Status: Norm—Indicates that the status of the tag is idle
Alert: NULL—Indicates that the alert is not setup yet
This is expected, since we have not setup the alerts yet.
Time: Indicates the time of last detection.
The values are irrelevant, since the reader is not running yet FIG. 9 illustrates a screenshot showing the front end application module 112 of filter search setting 902. In another preferred embodiment of the present invention, the filter search setting 902 allows the user to setup a filter for display purposes of the database entries.

In an exemplary embodiment of the present invention, the following instructions indicate the operation of the filter search setting 902.
Keyword: dbfilter
The table filter menu allows you to filter entries within the database based on your entry.
Entry: Select an entry based on the definition below:
tagnumb: Enter the tag number with '-' as it appears in the database
tagname: Enter the tag name as it appears in the database
detectstat: PRES or MISS
execpriority: NORM, MED, or HIGH
execstat: NORM, OK
cmd: READ
rssi: 0-0xff
antid: not currently supported
alert: start or stop
alertsign: equal, greater, smaller
alertvalue: PRES, MISS
alerttype: detectstat
timeinterval: depending on the value set (5 . . . )
eventstart: start time yyyy-mm-day hh:mm:sec
access: start time yyyy-mm-day hh:mm:sec
Value: Enter a value based on the entries above.
Filter Enable: Select true to enable filter
Example:
Entry: tagname
Value: sportsandhealth
Filter Enable: true FIG. 10 illustrates a screenshot showing the front end application module 112 to show the status of the event module 113 in accordance with an exemplary embodiment of the present invention. The event module 113 allows the user to obtain the status of the event.

For exemplary purposes, the instructions for checking on the status of the event module 113 are as follows:
Keyword: areview
Event Monitor St: yes
The Event Monitor needs to be enabled to receive alerts.
Enable Alerts: yes
The Alerts need to be enabled to receive alerts.
Congratulations! You can now receive alerts when a tag is missing.

EXAMPLES

Non-limiting, exemplary embodiments of the present invention are as follows:

Example 1: Warehouse—Finding Metal Parts

The present invention may be installed in an industrial workroom to allow users to find the location of metal parts, parts containers, and work orders, which accompany each part located in the workroom. Metal parts to track vary in size from a few inches to a few feet with smaller parts assigned in plastic bins. A work order accompanies each part or container.

In the warehouse, there may be 30 work zones to cover with each zone roughly 12 feet×12 feet in dimension. The configuration of desks or workspaces within each zone is not set as the furniture or workbenches may be set up differently depending on the project being worked on at the time.

Each asset may be tagged by an RFID UHF 18000-6C Gen2 tag specifically designed for the specific end-user. As configured and described herein, the present invention provides the user with location information of any asset within a zone in real time. The present invention may store the data information in the cloud using cloud services or on premise using a database server.

The present invention provides alerts to the customer via text or e-mail based on the customer's settings. The antennas may be located on the ceiling or on a desk. The readers may be powered using POE 24V switches or a power supply.

Example 2: Wandering Patient in a Hospital, Rehab Facility or Assisted Care Center In this example, the goal is to develop a solution that informs the staff when patients access the hallways at any time during the day or night or leave a facility.

Each patient may be fitted with an ISO-18000-60 Gen 2 tag around their neck or other comparable location.

As configured and described herein, the present invention detects patients who access the hallway. The hallways may contain one or more antennas. The readers may be connected via a 24V output POE switch. The gateway may be installed in a control room or ceiling with a UPS emergency power supply. As the patient moves throughout the facility, the reader is configured to send the patient location in real time to the gateway.

The information stored may contain the location of each patient. The data stored may also contain the date and time of last detection for each patient in a designated area.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A system for detecting information of assets stored in communication tags and communicating the assets information over a communication network, the system comprising:
   a bi-directional communication reader having at least one antenna with associated signal strength and antenna number, wherein the bidirectional communication reader processes the received assets information from the communication tags; and
   a server having a database for storing asset information, wherein the server communicates with the bi-directional communication reader and stores the asset information using a software application, the software application comprising:
   a front end application module to receive at least one operational mode from a user, wherein the operational mode relates to the setting of the operation of the bi-directional communication reader;
   an event module for reading the asset information from the database and alerting the user if a certain event occurs, the event module configured by the front end application module to set a specific rule that triggers an event;
   a back end application module configured via the front end application module, wherein the back end application module configures the bi-directional communication reader, as per the selected operational mode, to process the required information from the communication tags read by the bi-directional communication reader; and
   a communication module for receiving processed assets information from the communication tags via the bi-directional communication reader having at least one antenna, wherein the communication module communicates the processed assets information over the communication network via a proprietary protocol.

2. The system according to claim 1 wherein the software application further comprises an event module configured by the front end application module for setting up the event mode, and further the event module configured by the front end application module to send alert messages of missing assets, as per the selected alert setting, over the communication network.

3. The system according to claim 1 wherein the mode comprises at least one of:
   a monitoring mode that allows the user to set up priorities for discovery of assets located within the vicinity of the antenna through the front end application module, wherein the monitoring mode is configured in the back end application module to read the communication tags one at a time based on the assets priority setup in the database and compare and confirm the presence of assets located within the vicinity of the antenna;
   a discovery mode configured in the back end application module to read the assets information received from the bi-directional communication reader, wherein the discovery mode adds the assets by number into the database and discovery mode is configured in the front end application module to allow the user to read all assets simultaneously and only update the assets that are located in the database;
   a detection mode configured in the front end application informs the back end application to read and store current and newly discovered assets located within the vicinity of the antenna in the database;
   a check-in mode to provide status of the assets from information received from a bi-directional communication reader over the communication network, the check-in mode comprising at least one of: a check-in status to mark the entry of the asset; and a check-out status to mark the exit of the asset; and
   a real time mode configured in the front end application module to allow the user to quickly detect the presence of assets at a fast rate located within the vicinity of the antenna in the database, wherein the real time mode configured in the back end application module sets the number of antennas and quickly detects if any asset is missing based on the time when the asset is last detected;
   wherein the presence and absence of an asset in at least one of the operational mode results in updating of return signal strength and antenna number.

4. The system according to claim 3 wherein the antenna provides a range of power and communicates with the assets at different frequencies and ranges, further wherein any mode or the real-time mode sets antenna to locate assets depending on the number of antennas.

5. The system according to claim 1 wherein the operation mode further comprises a start-stop setting, wherein the start-stop setting is configured at the front end application module to allow the user to select at least one of: a start setting for starting operation of the bi-directional communication reader; and a stop setting for stopping operation of the bidirectional communication reader, further the start-stop setting configured at the back end application module to operate the bi-directional communication reader based on the selected at least one of the start setting and stop setting.

6. The system according to claim 1 wherein the software application further comprises a front end application module to setup a database to allow the user to set up the database for secure access.

7. The system according to claim 1 wherein the front end application module further comprises a table setup for allowing the user to customize display entries from the database.

8. A system for detecting information of assets in an inventory and further communicating the assets information over a communication network, the system comprising:
at least one communication tag attached to at least one asset for storing assets information;
a bi-directional communication reader having at least one antenna, wherein the bi-directional communication reader processes the assets information received from the communication; and
a server for communicating with the bi-directional communication reader and further stores and processes a software application, wherein the software application comprising:
a front end application module to receive at least one operational mode from a user, wherein the operational mode relates to setting of operation of the bi-directional communication reader;
an event module for reading the asset information from the database and alerting the user if a certain event occurs and it is configured by the front end application to set a specific rule that triggers an event;
a back end application module configured via the front end application module, further the back end application module configures the bi-directional communication reader as per the selected operational mode to process the required information from the communication tags; and
a communication module for receiving processed assets information from the communication tags via the bi-directional communication reader from the specific antenna and further the communication module communicates the processed assets information over the communication network using the RFR proprietary protocol.

9. The system according to claim 8 wherein the plurality of modules further comprises an event module configured in the front end application module for setting up an alert, and further the event module configured in the front end application module to send alert messages of missing assets as per the selected alert setting over the communication network.

10. The system according to claim 8 wherein the mode comprises at least one of:
a monitoring mode allowing the user to set up priorities for discovery of assets through the front end application module, further the monitoring mode configured in the back end application module reads the communication tags one at a time based on the assets priority, further the monitoring mode compares and confirms the presence of assets in the database;
a discovery mode configured in the back end application module to read the assets information received from the bi-directional communication reader, further the discovery mode adds the assets by number into the database, furthermore the discovery mode is configured in the front end application module to allow the user to update entries related to each asset in the database; and
a detection mode configured in the front end application module to store the assets information in the database, further the detection mode configured in the back end application module reads and confirms the position of the assets received from the bi-directional communication reader in the database;
a check-in mode to provide status of the assets over the communication network, the check-in mode comprising at least one of: a check-in status to mark the entry of the asset; and a check-out status to mark the exit of the asset and store the asset information in the database; and
a real time mode configured in the front end application module allows the user to detect the presence of assets located within the vicinity of the antenna read by the bi-directional communication reader in the database, further the real time mode configured in the back end application module quickly detects if an asset is missing based on the time when the asset is last detected.

11. The system according to claim 10 wherein the antenna provides a range of power and communicates with the assets at different frequencies and ranges, further wherein the real-time mode sets antenna to locate assets depending on the number of antennas.

12. The system according to claim 8 wherein the operation mode further comprises a start-stop setting, wherein the start-stop setting configured at the front end application module allows the user to select at least one of: a start setting for starting operation of the bi-directional communication reader; and a stop setting for stopping operation of the bi-directional communication reader, further the start-stop setting configured at the back end application module operates the bi-directional communication reader based on the selected at least one of the start setting and stop setting.

13. The system according to claim 8 wherein the front end application module further comprises a table setup for allowing the user to create custom entries in the database.

14. The system according to claim 8 wherein the communication tags are customizable with customer specific information and company specific information to make them accessible for specific users.

15. A method for detecting information of assets and communicating the assets information over a communication network, the method comprising the steps of:
storing information of each asset in the database from at least one communication tag;
processing assets information from the communication tag by a bidirectional communication reader, wherein the bi-directional communication reader has at least one antenna;
communicating with the bi-directional communication reader by a server, wherein a processed assets information is communicated over the network via a proprietary protocol using the communication module;
storing the asset information in the database using a software application, wherein the software application comprises a front end application module; an event module; a back end application module; and a communication module;
receiving at least one operational mode from a user, wherein the operational mode relates to setting of operation of the back end application;

configuring the event module using the front end application for reading the asset information from the database and alerting the user if a certain event occurs, the event module configured by the front end application module to set a specific rule that triggers an event;

configuring the back end application module via the front end application module;

configuring the back end application reader as per the selected operational mode to process the required information from the communication tags sent via the bi-directional communication reader;

receiving processed assets information by a communication module from the communication tags via the bi-directional communication reader from the specific antenna; and communicating the processed assets information over the communication network by the communication module.

16. The method according to claim 15 further comprising the steps of setting up an alert in the front end application module by an event module; and sending alert messages of missing assets as per the selected alert setting over the communication network by the event module.

17. The method according to claim 15 further comprising the steps of:

confirming the presence of assets located within the vicinity of the antenna via a monitoring mode;

updating entries related to each asset in the database via a discovery mode and further adding the assets by number into the server;

adding the new assets received from the bi-directional communication reader in the database via a detection mode;

providing status of entry and exit of each asset over the communication network via a check-in mode; and detecting quickly if an asset is missing or present based on the time when the asset is last detected via a real time mode.

18. The method according to claim 15 further comprising a step of setting up the database for secure access.

19. The method according to claim 15 further comprising a step of customizing communication tags with customer specific information and company specific information to make them accessible for specific users.

* * * * *